Patented Feb. 8, 1944

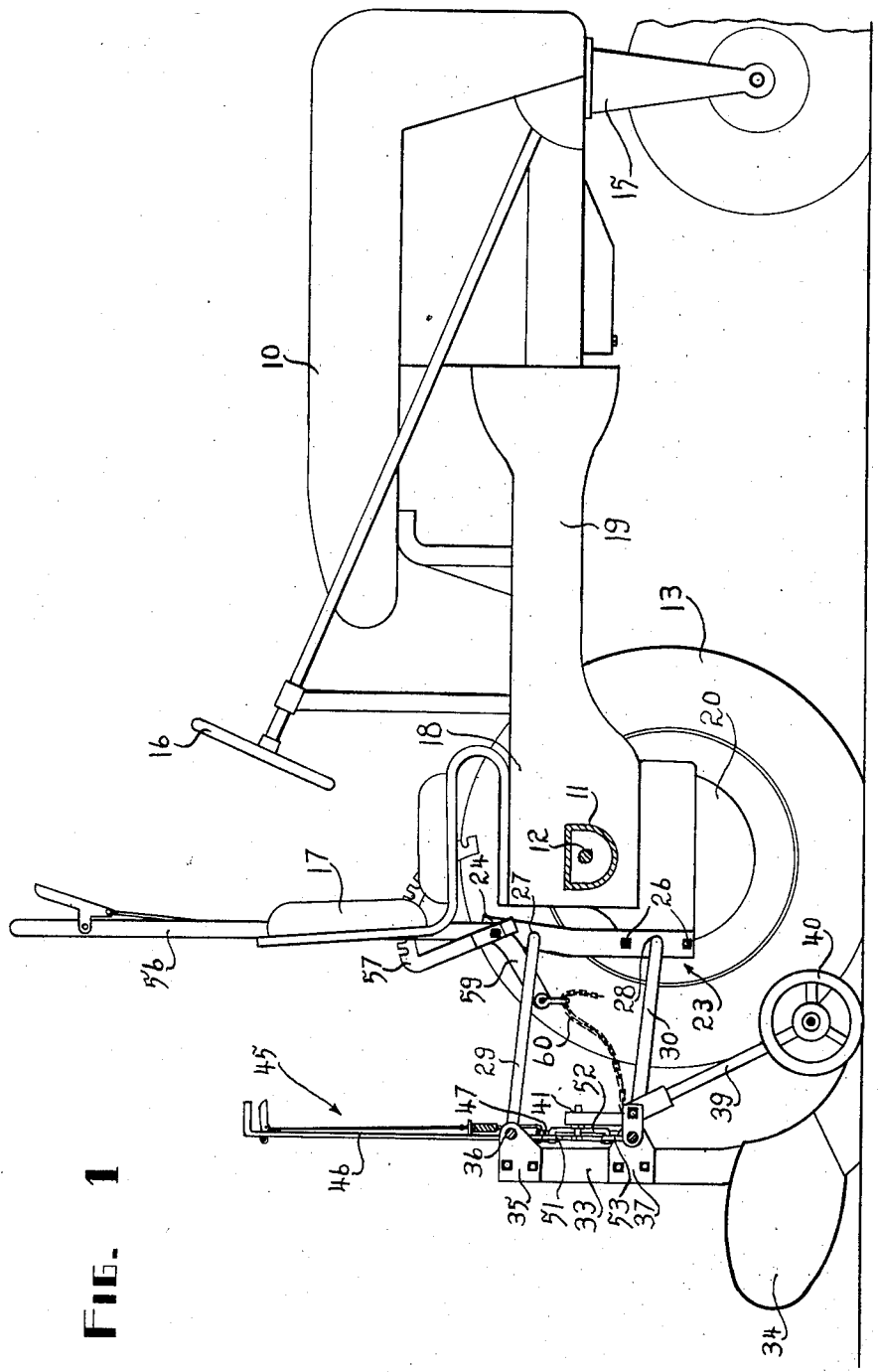

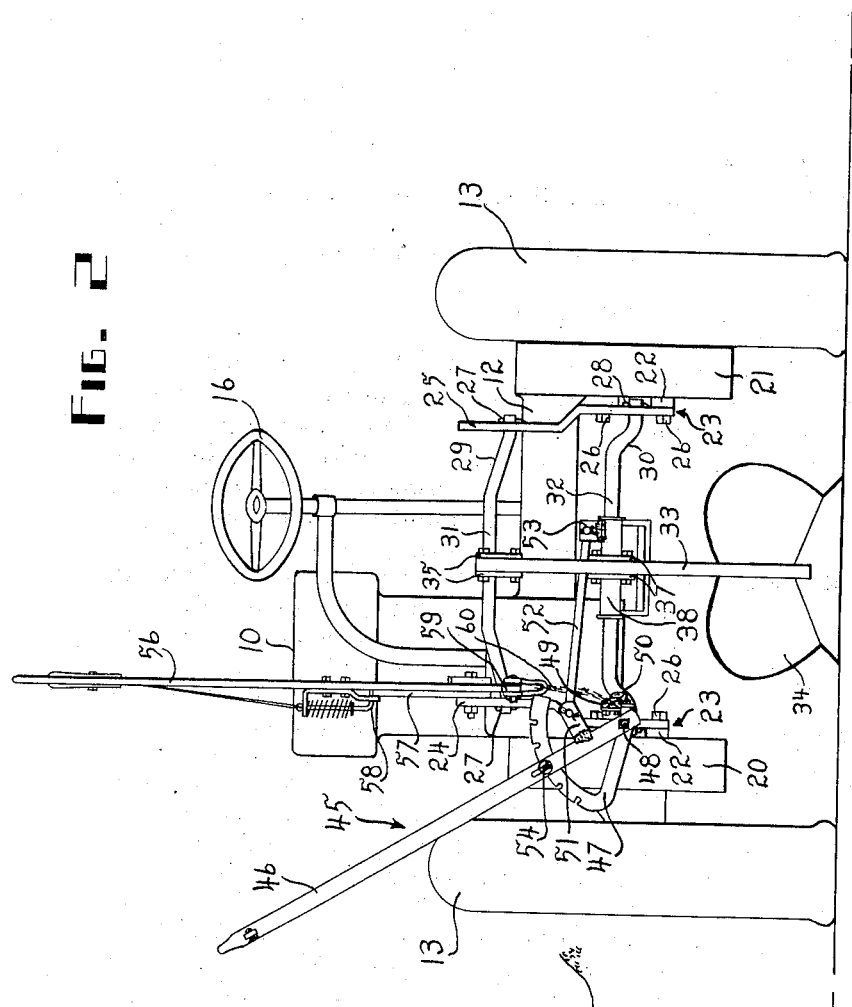
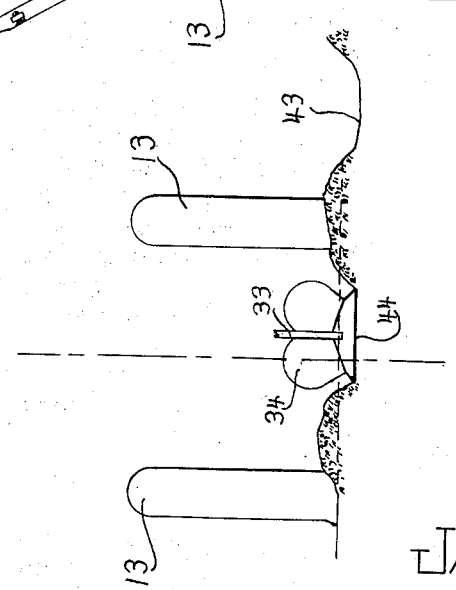

2,341,179

UNITED STATES PATENT OFFICE 2,341,179

TRACTOR-MOUNTED IMPLEMENT

James L. Hipple, Canton, Ill., assignor to International Harvester Company, a corporation of New Jersey Application June 30, 1941, Serial No. 400,370

6 Claims. (Cl. 97—47)

This invention relates to tractor-mounted implements and more particularly to such implements adapted for use with narrow tread tractors.

It is an object of the present invention to provide in a tool attachment for narrow tread tractors, means for laterally adjusting the working tool with respect to the tractor wherein with the drive wheels traveling on the unplowed ground, the regulation row spacing common to pull-behind tools of the furrowing type may still be had.

It is another object of the invention to provide manual adjusting means for laterally adjusting the working tool relative to the tractor on the vertically movable lifting bails themselves and which means is accessible to the operator's station on the tractor.

According to the present invention the working tool is connected to the tractor by means of a pair of vertically spaced lifting bails, and a vertically extending tool beam is provided for the connection of the working tool to these lifting bails. This beam is slidable on the transverse portions of the lifting bails. Also, on one of the lifting bails there is provided a manually adjustable means which is accessible to the operator's station and which is so connected with the vertically extending beam as to laterally adjust the same along the transverse portions. This adjustable means is operated to locate the working tool or middle buster toward the previously formed furrow and toward the wheel operating on the unplowed ground nearest to the furrow. When the tractor has completed its operation across the field, the manually adjustable means may then serve to position the working tool closer to the opposite wheel for the return of the tractor across the field in the opposite direction. By being able to so locate the working tool, the narrow tread tractor is operated always on the unplowed ground and at the same time regulation row spacing of the furrows, which is ordinarily had with the wider type tractor, is had with this narrow tread type of tractor.

For other objects and for a better understanding of the invention, reference may be had to the following detailed description taken in connection with the accompanying drawings, in which:

Figure 1 is a view in elevation of a tractor and of a tool attachment embodying the features of the present invention;

Figure 2 is a rear view of the tractor and of the implement attachment showing more clearly the manually adjustable means for the adjusting of the working tool with respect to the transverse portions of the bail; and, Figure 3 is a diagrammatic view showing the position of the working tool with respect to the rear wheels of the tractor when in its plowing position.

Referring to the drawings, there is shown a tractor 10 having a rear axle structure 11 through which there extends a rear axle 12 for driving the tractor drive wheels 13. The forward part of the tractor is supported on the steerable wheel structure 15 adapted to be operated by a hand steering mechanism 16 accessible to an operator's station 17 upon the rear axle structure 11 of the tractor. The rear axle structure 11 includes the rear portion 18 of an offset longitudinally extending body portion 19 and the depending axle housings 20 and 21 to which the wheels 13 are connected to be driven. Each of these depending axle housings 20 and 21 has an attaching portion 22 to which a tool attachment, indicated generally at 23, is connected.

This tool attachment includes vertically extending bracket members 24 and 25 which are respectively attached to the respective portions 22 by clamping bolts 26. These vertically extending bracket members have spaced openings 27 and 28 adapted to receive the outwardly turned ends of the leg portions of vertically spaced upper and lower lifting bails 29 and 30. These lifting bails have transversely extending portions 31 and 32, respectively, which are in vertical alinement with each other. These bails are so connected into the openings of the brackets 24 and 25 that they are free to pivot vertically.

Connected to the transverse portions 31 and 32 is a vertically extending beam 33 having at its lower end a working tool 34. This working tool takes the form of a middle buster tool wherein the dirt is thrown up at both sides of the same to form alternate furrows and ridges on the field. The connection of the vertically extending beam 33 with the transverse portion 31 of the bar 29 merely includes forwardly extending bracket pieces 35 having openings 36 therein. These openings are of sufficient looseness to permit the sliding of the bracket members 35 along the transverse portion 31.

For the connection of the vertically extending beam 33 to the transverse portion 32 of the lifting bail 30 there are provided the bracket members 37 which carry a sleeve 38 fitted about the transverse portion 32 and sufficiently loose as to permit the same to be slid laterally across the transverse portion. To these plates 37 and to the sleeve 38 there is connected a forwardly extending gauge wheel supporting structure 39 having a gauge wheel 40 at its lower end arranged to be immediately above the forward portion of the working tool 34 so that it will be engaged by the working tool to effect lifting of the gauge wheel upon the working tool being raised to its transport position. The gauge wheel supporting structure 39 has an adjustable stop 41 adapted to abut with the vertically extending beam 33 to adjust the operating depth of the working tool.

It should now be apparent that the vertically extending beam 33 is so connected to the lifting bails 29 and 30 that the same can be laterally adjusted with relation to the tractor and toward or away from one of the driving wheels 13. Referring to Figure 3, there is shown diagrammatically the location of the working tool 34 when in its plowing position with reference to the driving wheels 13. With the narrow tread type tractors, this lateral adjustment of the working tool becomes necessary. At 43 there is shown a completed furrow. While forming a furrow 44 in which the working tool 34 is located, the tractor drive wheel 13 at the right side of the tractor will run ahead of the ridge thrown up from the furrow on the level unplowed ground and not in the furrow 43. Since the right-hand wheel 13 is not traveling in the furrow 43, it is necessary that some means for the adjusting of the working tools 34 closer to the right-hand drive wheel 43 be provided. By the use of vertically spaced bails 29 and 32 provision is readily made for the connection of the tool beam 33 to have this lateral sliding movement and the structure becomes simplified.

As a means for laterally adjusting the tool beam 33 and its working tool 34, and for retaining the same in their laterally adjusted position, there is provided a manual adjusting means 45 having an operating lever 46 accessible to the operator's station 17 whereby the operator may move the working tool 34 from one side of the tractor to the other side of the tractor depending upon the direction of movement of the tractor across the field. When the furrowed land is at the right, the working tool 34 will be near to the right-hand drive wheel whereas when the furrowed land is at the left the working tool 34 will be near to the left-hand drive wheel.

This adjusting mechanism 45 is supported on the lower bail 30 and at the left side thereof. In addition to the lever 46 it includes a quadrant 47 over which the lever works, the lever being pivoted at 48. The adjusting mechanism 45 is connected to a bracket structure 49 which is in turn welded to one of the leg portions of the lifting bail 30, as indicated at 50. Immediately above the pivot 48 there is provided a rigid extension 51 on the lever 46 which is connected by means of a link 52 to a lug 53 rigidly secured to the sleeve 38. It should thus be apparent that any movement of the lever 46 over the quadrant 47 will effect lateral movement of the sleeve 38 and the tool beam 33. The beam 33 will slide with respect to the transverse portions 31 and 32. On the adjusting mechanism 45 there is provided the usual locking detent means 54 which will serve to retain the tool beam 33 in its laterally adjusted position.

As a means for effecting movement of the working tool 34 to a transport position, there is provided a manual lifting mechanism also accessible to the operator's station 17. Said mechanism includes a lever 56 and a quadrant 57 over which the lever is worked and is locked in place by a detent mechanism 58. The lower end of this lever has thereon a rearwardly extending arm 59 which is connected to the lower bail 30 by means of a chain 60. As the lever 56 is moved forward, the chain 60 will become tightened and the tool beam and its working tool will be raised to a transport position.

It should now be apparent that there has been provided an arrangement of simple construction for the connection of the working tools 34 to a tractor, wherein the same may be given a lateral adjustment with respect to the tractor. This lateral adjustment is simple since the working tool beam 33 is connected to the free ends of the lifting bails for lateral adjustment, and thus it need not be necessary that the supporting or lifting bails be laterally adjusted. By using the vertically spaced lifting bails for the connecting of the working tool to the tractor the lateral adjusting mechanism may be connected to the bail itself and at the same time in a location accessible to the operator's station.

While various changes may be made in the detail construction, it shall be understood that such changes shall be within the spirit and scope of the present invention as defined by the appended claims.

What is claimed is:

1. In a ground-working machine having running-gear wheels so laterally spaced with respect to the lateral spacing of a to-be-worked path from a previously-worked parallel path that, should the machine be facing in one direction along said paths, with a certain of said wheels in a desired gauging relation beside the previously-worked path, the to-be-worked path is spaced to one side of the mid-position between said wheels, and that, should the machine be facing in the opposite direction, with a certain other of said wheels in such desired gauging relation, said to-be-worked path is spaced to the other side of said mid-position; the combination of tool-carrying means for a tool adapted to work said paths, comprising parallel bail members pivotally connected with the machine at their free ends for swinging about respective horizontal vertically-spaced axes directed laterally of the machine and arranged with their spanning portions generally in spaced vertical alinement, a generally upright tool beam adapted to carry said tool upon its lower end and having upper and intermediate portions pivotally connected respectively with the upper and lower of said spanning portions and adjustable thereon laterally of the machine to dispose the tool upon either side of said mid-position into registry with said to-be-worked path according to the direction the machine faces along said paths; and means on said tool-carrying means manually operable to so adjust said tool beam.

2. In a ground-working machine having running-gear wheels so laterally spaced with respect to the lateral spacing of a to-be-worked path from a previously-worked parallel path that should the machine be facing in one direction along said paths, with a certain of said wheels in a desired gauging relation beside the previously-worked path, the to-be-worked path is spaced to one side of the mid-position between said wheels and that should the machine be facing in the opposite direction, with a certain other of said wheels in such desired gauging relation, said to-be-worked path is spaced to the other side of said mid-position; the combination of tool-carrying means for a tool adapted to work said paths, comprising a parallel link arrangement wherein there are upper and lower link members having end portions pivotally connected with the machine for pivotal movement about respective horizontal vertically-spaced axes directed laterally of the machine and having outer end portions spaced radially from said axes, upper and lower laterally and horizontally extending bearing members respectively upon said outer end portions of said link members, said bearing members reaching laterally in both directions from said mid-position, and a generally upright tool beam adapted to carry said tool upon its lower end and having upper and intermediate portions pivotally connected respectively with the upper and lower of said bearing members and adjustable thereon laterally of the machine upon either side of said mid-position, depending upon the direction in which the machine is facing, to dispose the tool in registry with the to-be-worked path; and means on said tool-carrying means manually operable to so adjust said tool beam.

3. The combination set forth in claim 2, and wherein said manually operable means comprises lever and segment means upon the lower of said link members at one end of the bearing member thereon, and an operating link extending in general parallelism with such bearing member in operating connection between said lever and a portion of said beam adjacently to such bearing member.

4. In a ground-working machine having running-gear wheels so laterally spaced with respect to the lateral spacing of a to-be-worked path from a previously-worked parallel path that should the machine be facing in one direction along said paths, with a certain of said wheels in a desired gauging relation beside the previously-worked path, the to-be-worked path is spaced to one side of an intermediate position on the machine between said wheels and that should the machine be facing in the opposite direction with an opposite of the laterally-spaced wheels in such desired gauging relation with the previously-worked path, said to-be-worked path is spaced to the other side of said intermediate position; the combination of tool-carrying means for a tool adapted to work said paths, comprising a parallel link arrangement wherein there are upper and lower link members having end portions pivotally connected with the machine for pivotal movement about respective horizontal vertically-spaced axes directed laterally of the machine and having outer end portions spaced radially from said axes, upper and lower laterally and horizontally extending bearing members respectively upon said outer end portions of said link members, and a tool beam having a lower portion adapted to carry said tool and upper and intermediate portions connected respectively with the upper and lower of said bearing members and adjustable thereon laterally of the machine to dispose said tool upon either of said sides of said intermediate position, depending upon the direction in which the machine is facing along said paths, in registry with the to-be-worked path; and means on said tool-carrying means manually manipulatable to so adjust the tool beam.

5. In a ground-working machine for working laterally spaced paths in a field and having laterally spaced running gear wheels arranged to ride in the space between said paths, the combination of a pair of vertically spaced bails pivoted upon said machine for vertical movement with respect thereto, a substantially vertically extending tool-carrying beam mounted on said bails for lateral movement with respect thereto to opposite sides of a mid-position between said wheels to place the tool in laterally spaced relation to either of said wheels, means for effecting vertical pivotal movement of said bails to raise and lower said beam with respect to the ground, and means manually operable to laterally move said beam to either side of said mid-position.

6. In a ground-working machine for working laterally spaced paths in a field and having laterally spaced running gear wheels arranged to ride in the space between said paths, the combination of a pair of vertically spaced bails pivoted upon said machine for vertical movement with respect thereto, a substantially vertically extending tool-carrying beam mounted on said bails for lateral movement with respect thereto to opposite sides of a mid-position between said wheels to place the tool in laterally spaced relation to either of said wheels, means for effecting vertical pivotal movement of said bails to raise and lower said beam with respect to the ground, and means including a manually operable lever pivotally mounted on one of said bails and connected to said beam for laterally moving said beam to either side of said mid-position.

JAMES L. HIPPLE.